United States Patent
Page et al.

[15] 3,676,635
[45] July 11, 1972

[54] METHOD AND APPARATUS FOR WELDING HONEYCOMB CORE PANEL AND THE LIKE

[72] Inventors: George A. Page, Reynoldsburg; Robert R. Rathbun, Middletown; Bruce E. Kramer, Loveland, all of Ohio

[73] Assignee: Aeronca, Inc., Middletown, Ohio
[22] Filed: Jan. 19, 1971
[21] Appl. No.: 107,727

[52] U.S. Cl. ............................219/92, 219/97, 219/117 HD
[51] Int. Cl. .........................................................B23l 11/10
[58] Field of Search..................219/117 HD, 117 R, 107, 97, 219/113, 92, 137

[56] References Cited

UNITED STATES PATENTS

| | | | |
|---|---|---|---|
| 2,814,718 | 11/1957 | Hardesty et al. | 219/117 HD |
| 2,902,589 | 9/1959 | Wirta | 219/107 |
| 3,487,190 | 12/1969 | Glorioso et al. | 219/113 X |
| 2,947,848 | 8/1960 | Sciaky | 219/117 R |

Primary Examiner—J. V. Truhe
Assistant Examiner—L. A. Schutzman
Attorney—Wood, Herron & Evans

[57] ABSTRACT

Process of welding, and apparatus therefor, in which two members to be welded are positioned relative to each other in an orientation susceptive of establishing localized zones of high electrical field intensity, which zones also exhibit high electrical resistance relative to the resistance of the individual members. An electrical potential is applied between the positioned members by electrodes in contact therewith to produce a spark discharge in the localized zones of high electrical field intensity and for a period sufficient to produce plasticity in the members only at the localized zones. An upset force is applied to the members while plastic in the localized zones to unite, by forging action, the plastic weld material of the members. A dielectric material, ultimately subjected to breakdown by the welding potential, preferably is positioned between the members to be welded at the zones of high electrical field intensity, enhancing the localized nature of the concentrated high electrical intensity field. A magnetic field may be established in the region of the electrodes to limit electrical shunting of the electrodes, and hence of the members to be welded through which the welding current desirably flows, by the shunting action of a previously welded section located adjacent the yet unwelded section.

3 Claims, 7 Drawing Figures

PATENTED JUL 11 1972
3,676,635
SHEET 1 OF 2
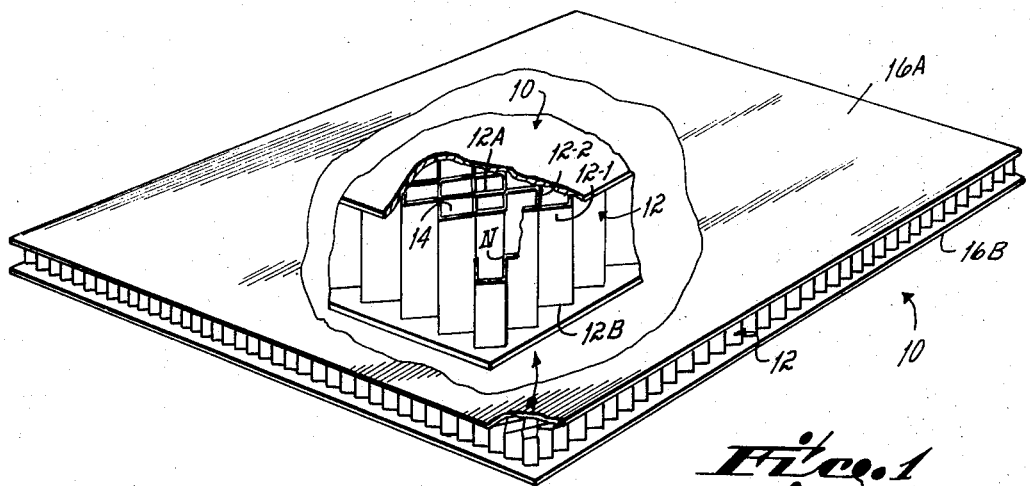
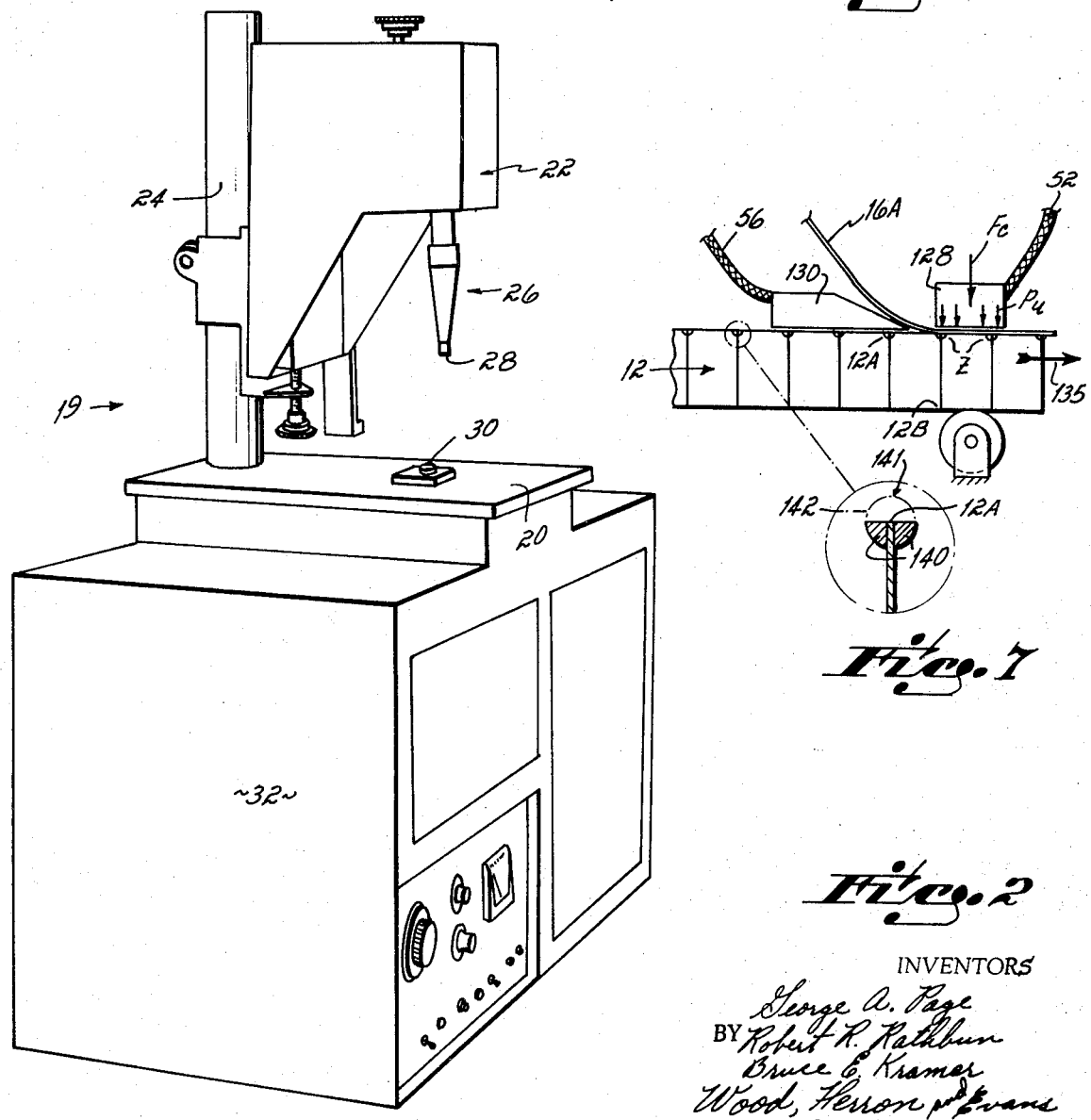
INVENTORS
George A. Page
BY Robert R. Rathbun
Bruce E. Kramer
Wood, Herron & Evans
ATTORNEYS PATENTED JUL 11 1972 3,676,635
SHEET 2 OF 2
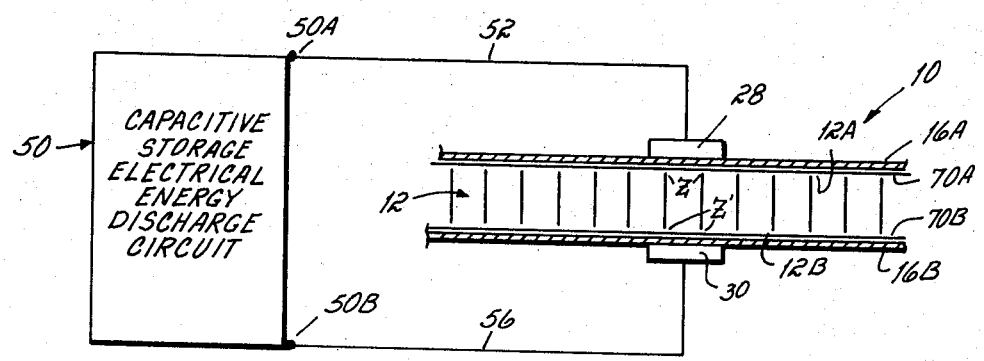
Fig. 3
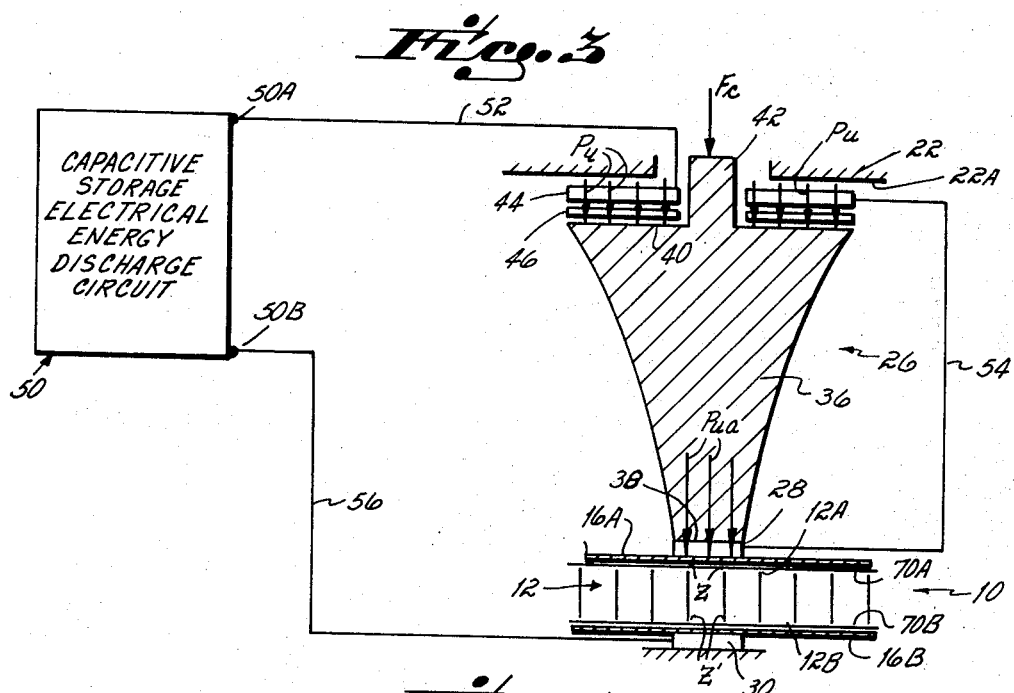
Fig. 4
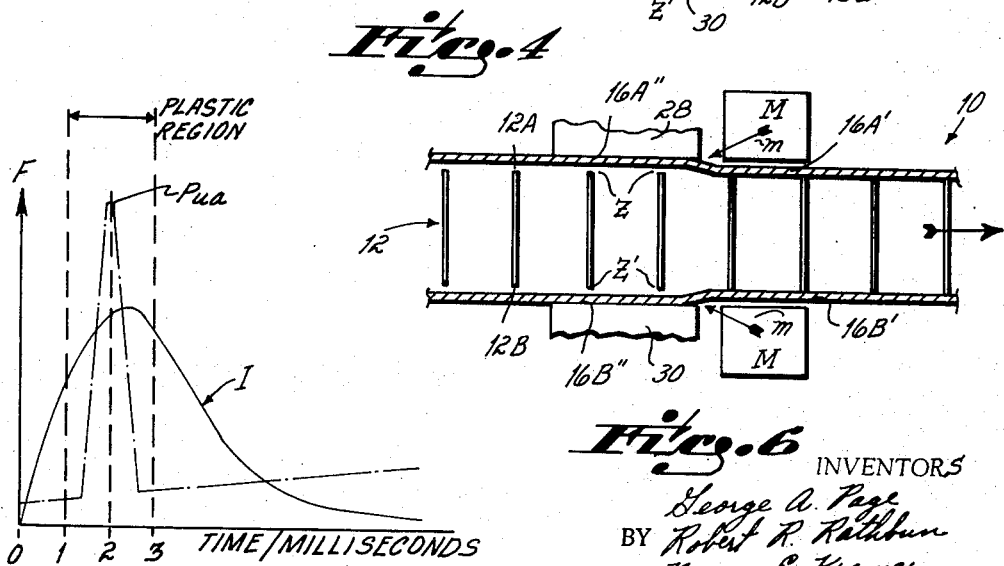
Fig. 5
Fig. 6
INVENTORS
George A. Page
BY Robert R. Rathbun
Bruce E. Kramer
Wood, Herron and Evans
ATTORNEYS

METHOD AND APPARATUS FOR WELDING HONEYCOMB CORE PANEL AND THE LIKE

This invention relates to welding, and more particularly, to a method and apparatus which is particularly useful for welding cover sheets or skins to cores of the honeycomb type in which the cover sheet is joined to the core along the edges of corrugated ribbons which comprise the core.

Honeycomb, or cellular, core panels have long been used for structural members because of their high strength-to-weight ratios, and their ability to be formed into single and/or compound contoured shapes of high strength and low density. Honeycomb core panels typically include a honeycomb, or cellular core and a pair of skins, sandwich facings or cover sheets between which the core is sandwiched. The honeycomb core itself includes a plurality of cells arranged in a periodic grid, lattice, or matrix-type network. The cells are defined or established by interconnected elongated ribbons extending in a direction such that the plane of the ribbons at any point is perpendicular to the plane of the core and the cover sheets or skins associated with it. Typically some or all of the ribbons are corrugated into some type of repeating, generally sinuous or zigzag pattern comprised of alternating nodes, or peaks and valleys. Depending upon the exact geometrical configuration of the corrugations, and upon whether all ribbons or only alternate ribbons of the core plane are corrugated, the cells of the honeycomb core structure may assume any one of a variety of different shapes, such as hexagons, rectangles, squares, cruciforms, and the like.

Heretofore it has been proposed to secure the cover sheets or skins to the edges of the ribbons which define the surface of the core by utilization of resistance welding techniques. In accordance with this proposal, welding electrodes are contacted with the members to be welded, e.g., the opposing skins which sandwich the core, and a welding voltage, for example, 15-60 volts, is applied, causing a welding current to pass through the skins and core. The welding current melts the skin and core ribbons at their points of contact which, upon cooling, fuse together to establish a weld between the edges of the core ribbons and the adjacent surface regions of the skins.

As a practical matter, prior to this invention, no completely satisfactory process of welding honeycomb panels has been developed. Consequently, at the present time almost all honeycomb cores and skins are assembled by brazing.

Difficulties with prior welding attempts have been due in large part to the fact that in most honeycomb core panels the thickness of the foil stock from which the core ribbons are made is only a fraction, e.g., one-third to one-thirtieth, of the thickness of the sheet stock from which the skins are made. This inherently makes it difficult to provide a welding current sufficient to melt the thicker skins which, at the same time, does not disintegrate or blow away the substantially thinner core ribbon edges to which the skins are to be welded. Obviously, welding currents sufficient to satisfactorily melt the heavier gauge skins may, because of the greater resistance of the lesser gauge core ribbon, unduly melt the core ribbons and disintegrate the ribbon edges. Alternatively, a welding current sufficient to satisfactorily melt the ribbon edges is often insufficient to produce a satisfactory condition of plasticity in the adjacent cover sheet or skin.

In the past, a number of solutions have been proposed for solving the problem introduced by differing thickness core ribbons and skins. For example, it has been proposed to deposit layers of high conductivity metal on the core ribbons, on the theory that such high conductivity layers will permit the core to carry a far greater current without damage than was previously possible. Other proposals have involved placing an intermediate layer of conductive material, such as woven metal cloth or perforated metal foil, between the edges of the supporting core ribbon and the skins to be welded to it. In accordance with this proposal, the interposed conductive metal cloth or perforated metal foil provides evenly spaced points of electrical contact which theoretically evenly distribute the resistance to produce a weld without burning and disintegration of the edges of the supporting core. These and other approaches have not been entirely satisfactory by virtue of the increased cost and/or the nonuniformity in weld quality over the entire honeycomb core panel often resulting.

It has been an objective of this invention to provide a method and apparatus for welding cover sheets or skins to the ribbon edges of a honeycomb core which overcomes the problems, such as burning and disintegration of the core ribbon edges, present when the skin and core ribbon differ in thickness. This objective has been accomplished in accordance with certain of the principles of this invention by a unique combination of steps which include positioning two members to be welded, such as a skin and core, in an orientation susceptive of establishing, at points where the ribbon edges and skin meet, localized zones of high electrical field intensity, which zones also exhibit high electrical resistance relative to the electrical resistance of the ribbon itself or the skin; applying an electrical potential between the core and skin sufficient in magnitude to produce substantial electrical current flow, preferably a spark or electrical discharge resulting in a plasma, at the localized zones of high electrical field intensity and sufficient in duration to render plastic or molten, in response to the electrical energy or current flow, only those portions of the core ribbon edge and skin which define the zones of high electrical field intensity; and applying an upset force to the core and skin, while such are plastic in the localized zones, which is sufficient in magnitude to unite, by forging action, the plastic weld material of the skin and core ribbon present at the localized zones. Preferably, the electrical potential is applied by discharging capacitively stored electrical energy through the members to be welded. Discharge of capacitively stored electrical energy produces plasticity in the zones of high electrical field intensity without undesirable heating of the remainder of the members being welded.

The welding process of this invention has been found to produce satisfactory welds of uniformly high quality between skins and supporting cores, and to produce such without the need and associated expense of providing specialized, highly conductive elements or coatings to or between the members to be joined for the purpose of equalizing the resistance of members to be joined, such as skins and cores, initially having differing thicknesses and, hence, differing resistances.

In a preferred form of this invention, a dielectric layer such as paper, plastic, paint or the like is interposed between the skins and core. The interposition of a dielectric layer between the members to be welded, while entirely opposite in concept to the prior art proposals which have involved the use of highly conductive intermediate layers or coatings, has and for reasons not entirely understood materially enhanced the resultant weld produced by the process of this invention. It is theorized that the dielectric layer interposed between the skins and supporting core edges in the preferred form of this invention increases the concentration, and hence the intensity of the electrical field, in the localized zones established by the core ribbon edges and the adjacent portions of the skin. This in turn enhances the localization of the current flow or electrical discharge and resulting high intensity plasma. The portions of the members being welded which define the localized zones of high electrical field intensity therefore, serve as electrodes from which electrical discharge occurs only in the limited regions of maximum electric field intensity, namely, only at the edge of the ribbon and the portion of the skin immediately opposite thereto.

When welding large members in successive steps, sections which have previously been welded tend to shunt welding current designed for flow through the yet unwelded section of the members through those sections which have already been welded. This shunting of weld current away from the yet unwelded sections prevents the proper degree of plasticity from occurring at points where the unwelded sections are to be joined, producing an inferior weld. This shunting problem, in accordance with a further novel aspect of this invention, is materially reduced. Specifically, in accordance with a preferred form of this invention, a magnetic field is applied in the region of the yet unwelded sections of the skin and core, and so directed as to force the welding current flowing between the electrodes through the yet unwelded skin and core sections, in turn minimizing the amount of welding current which is shunted through a previously made weld and away from the yet unwelded core and skin sections.

A further aspect of this invention contemplates providing compact and efficient means for applying the upset force to the members to be welded in the desired predetermined timed relationship to the interval when the welding current is passing through the members to render them plastic at the localized zones of high electrical field intensity. In a preferred form, this objective has been accomplished by orienting an electromagnetic coil, through which the weld current is passed in the course of flow through the weld electrodes and the members being welded, relative to the members being welded in a manner such that an intense mechanical force is applied to the members being welded as a consequence of passage of the welding current through the coil. Since the same current flow which plasticizes the members to be welded also passes through the coil which generates the upset force, proper timing between the upset force and plasticity of the members being welded is assured.

These and other objects and advantages of the present invention will be more readily apparent from a consideration of the drawings illustrating a typical product produced by the invention and apparatus for carrying out the present method and illustrating the various aspects of the method.

In the drawings:

FIG. 1 is a perspective view, partially broken away, of a typical honeycomb panel fabricated in accordance with the present method.

FIG. 2 is a perspective view of one form of apparatus for carrying out the method.

FIG. 3 is a diagrammatic view showing a honeycomb core being welded in accordance with the present method.

FIG. 4 is a semi-diagrammatic vertical sectional view of a welding apparatus embodying the present invention.

FIG. 5 is a diagram showing the time relationship of the weld current and upset pressure applied to the members being welded.

FIG. 6 is a schematic front elevational view of a modification of the invention designed to permit welds between unwelded sections of members located in proximity to sections of the members previously welded.

FIG. 7 is a schematic front elevational view of another modification of the invention in which the electrodes are positioned on the same side of the core, instead of on opposite sides thereof.

For the purpose of more clearly understanding the apparatus and method of this invention, the invention is described with respect to an application for which it possesses an unusually high degree of utility, namely, welding honeycomb core panel assemblies, particularly the welding of the skins or cover sheets to the supporting edges of the cores. Of course, the invention is useful for welding other than skins to cores, this being only a preferred application.

As shown in FIG. 1, a honeycomb core panel 10 includes a honeycomb core 12 fabricated of elongated corrugated ribbons 12—1, 12—2, . . . which are disposed parallel to each other and joined at their nodes N to form cells 14. The upper and lower edges 12A and 12B of the ribbons 12—1, 12—2, . . . define upper and lower surfaces of the core 12. The honeycomb core panel 10 further includes upper and lower sheets, sandwich facings, covers or skins 16A and 16B, the inner surfaces of which are welded to the edges 12A and 12B of the core ribbons 12—1, 12—2, . . . to form the panel assembly 10. The core ribbons 12—1, 12—2, . . . and the panel sheets 16A and 16B can be fabricated of any suitable sheet material such as steel and alloys thereof, titanium and alloys thereof, materials termed "super alloys" having a nickel or chromium base, or the like. The panel covers 16A and 16B, as well as the core ribbons 12—1, 12—2, . . . may be fabricated of any suitable thickness sheet stock, although preferably the cover and ribbon thicknesses are selected such that the cover thickness exceeds the thickness of the core ribbons by a factor of 3–30. Skin thicknesses in the approximate range of 0.005–0.125 inches are typically employed; and core ribbon thicknesses in the approximate range of 0.001–0.006 inches are common. In one preferred honeycomb core panel, the covers 16A and 16B are fabricated of SS—321 annealed stainless steel having a thickness of 0.010 inches, and the ribbons 12—1, 12—2, . . . are fabricated of Inconel 625 foil having a thickness of 0.003 inches.

A preferred welding apparatus capable of practicing the welding method of this invention is shown in FIG. 2. As shown in this Figure, the apparatus includes a capacitor discharge welder 19 having a stationary platen 20, and a weld head 22 which is selectively vertically positionable with respect to the platen 20 on a post 24 which projects upwardly from the platen. Downwardly projecting from the weld head 22 is an upset member 26 having secured at its lower end an electrode 28. Electrode 28 cooperates with an electrode 30 mounted to the platen 20 to apply an electrical potential between the members to be welded, such as a honeycomb core and cover sheet assembly 10 (FIG. 1) positioned between the electrodes. The upset member 26 applies to the members to be welded, in predetermined timed relationship to the applied electrical potential, an upset force which completes the weld, in a manner to be described.

A cabinet 32 on which the platen 20 is stationarily supported encloses a capacitive electrical energy storage circuit (not shown in FIG. 2) which, when discharged through a circuit path including electrodes 28 and 30 and the members to be welded interposed therebetween, applies an electrical potential between the members to be welded. A capacitor discharge welder suitable, when modified in a manner to be described, for practicing the invention is marketed by the Sorenson Division of Raytheon Corporation, Norwalk, Connecticut, designated Model 1103, provided with weld head model M or KA. Welding apparatus of the foregoing type has a capacitance selectively variable in increments up to 50,000 microfarads, and is capable of supplying to the electrodes 28 and 30 selectively variable electrical potentials of up to 3,000 volts.

The upset member 26, as shown in FIG. 4 and constituting a modification of a commercially available welded, includes a pressure amplifier 36, preferably frusto-conical in shape, having a flat circular lower surface 38 and an upper annular surface 40 from the center of which upwardly projects a stub 42. The stub 42 extends into the weld head 22 to facilitate application to it of a downward clamp force $F_c$. The clamp force $F_c$ is static in nature and applied by the weld head 22 for the purpose of establishing low resistance electrical contact between upper and lower electrodes 28 and 30, and their respectively associated upper and lower cover sheets 16A and 16B which it is desired to weld to the upper and lower edges 12A and 12B of the core ribbons 12—1, 12—2, . . . sandwiched therebetween. A clamp force $F_c$ of from 25–50 pounds per square inch electrode area has been found suitable.

An electrical coil 44 wound in the form of a pancake or disc surrounds the stub 42 between the lower surface 22A of the weld head 22 and an electrically conductive apertured disc 46 also surrounding the stub. The coil 44 is connected via a wire 54 in series circuit relationship with the upper and lower electrodes 28 and 30 and the core panel members to be welded 12, 16A, 16B positioned therebetween. This series circuit,in turn, is connected across terminals 50A and 50B of a capacitive storage electrical energy discharge circuit 50 via a wire 52, discharge circuit terminal 50A, and one side of the coil 44, and a wire 56 interconnecting the lower electrode 30 and the other terminal 50B of the discharge circuit 50. Coil 44 in combination with the conductive disc 46, when electrically connected as described, applies an upset pressure $P_u$ to the upper surface 40 of the pressure amplifier 36. The upset pressure $P_u$ is produced as a consequence of the passage through coil 44 of the capacitively stored electrical energy discharged by the circuit 50 as an incident to the welding process. The upset pressure $P_u$ is multiplied by the pressure amplifier 36 and the amplified pressure $P_{ua}$ applied by amplifier end 38 to the members to be welded 12, 16A, 16B. Pressure amplification is produced by virtue of the fact that the surface area of amplifier end 40 to which upset pressure $P_u$ is applied by coil 44 is larger than the area of surface 38 which applies pressure $P_{ua}$ to members 12, 16A, 16B to be welded.

To weld members, such as cover sheets 16A and 16B to core 12, the members are positioned relative to each other in an orientation susceptive of establishing therebetween localized zones Z of high electrical field intensity, the zones of high electrical field intensity also exhibiting high electrical resistance relative to the electrical resistance of the individual members. For example, if the members to be welded are cover sheet 16A and honeycomb core 12, the members are positioned such that the ribbons 12—1, 12—2, . . . are adjacent the cover sheet 16A only in the region of the ribbon edges 12A. With only the edges 12A of the ribbons 12—1, 12—2, . . . adjacent the cover sheet 16A, localized zones Z of high electrical field intensity are produced between the ribbon edges 12A and the portion of the sheet 16A opposite thereto when an electrical potential is applied to the cover and core by electrodes 28 and 30 in the course of the welding process. The lower cover sheet 16B is similarly oriented with respect to the lower edges 12B of core ribbons 12—1, 12—2, . . . to provide therebetween localized zones Z' of high electrical field intensity in the region defined by the lower edges 12B of the ribbons 12—1, 12—2, . . . and the portion of the lower sheet 16B opposite thereto. The positioning of the members to be welded, such as sheet 16A and core 12, or sheet 16B and core 12, must also be such that the resulting localized zones Z and Z' of high electrical field intensity, which occur between the upper and lower edges 12A and 12B of the core ribbons 12—1, 12—2, . . . and the adjacent portions of upper and lower cover sheet 16A and 16B, exhibit high electrical resistance relative to the electrical resistance of the individual members. Thus, the electrical resistance of the juncture defined by the ribbon edge 12A or 12B and section of the cover sheet 16A or 16B adjacent thereto must substantially exceed the resistance of the ribbon and cover.

After the members to be welded such as cover sheets 16A and 16B and core 12 are positioned in the manner described, the positioned assembly is clamped between electrodes 28 and 30 by the application of contact force $F_c$ to stub 42. Contact force $F_c$ insures the establishment of low resistance electrical contact between the electrodes 28 and 30 and the respectively adjacent covers 16A and 16B which are to be welded to opposite sides of the core 12.

Following clamping of assembled core 12 and cover sheets 16A and 16B between electrodes 28 and 30 by clamp force $F_c$, electrical energy capacitively stored in circuit 50 is discharged through the series circuit including line 52, coil 44, line 54, contact 28, weld members 12, 16A, and 16B, contact 30, and line 56. The voltage of the discharged electrical energy from circuit 50 must exceed the breakdown voltage of the high intensity electrical field zone Z and Z' between the edges 12A and 12B of ribbons 12—1, 12—2, . . . and the adjacent portions of the cover sheets 16A and 16B, so as to produce a high energy density plasma, preferably an electrical or spark discharge, in zones Z and Z' between ribbon edges 12A and 12B and adjacent sections of covers 16A and 16B. In practice the voltage is from approximately 25 to 75 volts or higher. Additionally, the duration of the electrical discharge from circuit 50 must be sufficient to sustain the high energy density plasma or electrical discharge in zones Z and Z' for a period of time sufficient to melt, or plasticize, the surface layers of the cover sheets 16A and 16B and associated ribbon edges 12A and 12B which define the high electrical field intensity zones Z and Z'. A preferred duration of electrical discharge is from 1 to 4 milliseconds.

While the surface layers of the members 12, 16A and 16B which define zones Z and Z' are still molten, or plastic, the upset pressure $P_u$ is applied by the coil 44 to the amplifier 36 which, following amplification, is applied to the members being welded via the end 38 of the amplifier. The magnitude of the upset pressure $P_{ua}$ applied to the members to be welded via amplified end 38 must be sufficient to unite, by forging action, the plastic weld material of members 12, 16A and 16B at localized zones Z and Z'. A suitable upset pressure range is from 10 to 20 psi of electrode area. Of course, upset pressure can be higher, so long as it does not crush the core.

A preferred relationship of upset pressure $P_{ua}$, and weld current I provided by the electrical potential of the discharge circuit 50, is shown in FIG. 5. With respect to this Figure, it is noted that the weld current I increases from zero to a maximum value in approximately 2 milliseconds, and thereafter exponentially decays toward 0. At a point in time when the weld current I is approaching its peak value, the upset pressure $P_{ua}$ is applied. The upset pressure occurs substantially instantaneously as indicated by the spiked shape of the upset pressure curve P. It is noted that the upset pressure $P_{ua}$ occurs when the adjacent surfaces of the members 12, 16A, 16B to be welded in high electrical field intensity zones Z and Z' are plastic, the members being rendered plastic in the localized zones Z and Z' at the approximately 1 millisecond point and remaining plastic until the 3 millisecond point of the welding process. In practice, maximum welding currents of 10,000—40,000 amperes per square inch of electrode area have been found to produce satisfactory weldments. Upset pressures, as noted earlier, of 10—20 pounds per square inch of electrode area have been found to produce satisfactory results.

The electrical field intensity in the localized zones Z and Z' defined by the upper and lower edges 12A and 12B of the core ribbons 12—1, 12—2, . . . and the adjacent surfaces of the upper and lower covers 16A and 16B can be enhanced, thereby enhancing the welding process, by providing dielectric material in the high electrical field intensity zones Z and Z'. FIG. 3 illustrates, in schematic form, a honeycomb core 12 having dielectric layers 70A and 70B sandwiched between the upper and lower edges 12A and 12B of the core ribbons 12—1, 12—2, . . . and their associated upper and lower covers 16A and 16B. Dielectric layers 70A and 70B may take a variety of forms, such as paper sheet stock, nonconductive paint, silicone-based dielectric sprays incorporating metal powder, polyethylene terephthalate. Alternatively, dielectric layers 70A and 70B may take the form of oxidation or anodization on the inner surfaces of the cover sheets 16A and 16B, or on the ribbon edges 12A and 12B. Dielectric layer thicknesses of 0.0015–0.0015 inches have been found satisfactory. Of course, it is understood that the thickness of the dielectric is in part a function of the material used, and can be varied.

The welding apparatus and method described in connection with FIGS. 4 and 5 is useful in welding the cover sheets 16A and 16B and core 12 with interposed dielectric layers 70A and 70B. Specifically, the upper and lower electrodes 28 and 30 are initially urged against the upper and lower surfaces of the cover sheets 16A and 16B to insure good electrical contact therebetween. The capacitively stored electrical energy in discharge circuit 50 is then discharged through the series circuit including wire 52, electrode 28, weld members 12, 16A, 16B, lower electrode 30, and wire 56. Assuming the voltage between discharge circuit terminals 50A and 50B is sufficient to break down the dielectric material 70A and 70B in the zones Z and Z' of high electric field intensity between the edges 12A and 12B and their associated sections of cover sheets 16A and 16B, the dielectric layer will break down. This dielectric breakdown results in a high density plasma or electrical discharge in the zones of high electrical field intensity, namely, in the zones Z and Z' defined by the upper and lower edges 12A and 12B of the core ribbons 12- 1, 12-2, . . . and the adjacent surfaces of the sheets 16A and 16B. Assuming the electrical discharge from circuit 50 is sufficient in duration, the plasma produced melts the surface layers of the cover sheets 16A and 16B and the core ribbon edges 12A and 12B defining the high electrical field intensity zones Z and Z'. The welding process is completed by applying an upset pressure $P_{ua}$ to the members to be welded 12, 16A, 16B while the layers thereof which define the high electrical field intensity zones Z and Z' are plastic. The upset force $P_{ua}$ unites the plastic areas of the upper and lower sheets 16A and 16B and their associated core ribbon edges 12A and 12B by forging action.

An advantage of use of dielectric layers 70A and 70B between core ribbon edges 12A and 12B and cover sheets 16A and 16B is that the dielectric layers, if placed on the inner surfaces of cover sheets 16A and 16B at the time of their manufacture, serves as a protective layer, keeping the inner surfaces of the cover sheets in a relatively clean condition prior to the time that the cover sheets are actually welded to the core 12. When the dielectric layers 70A, 70B undergo electrical breakdown during the welding process by the high electrical field intensity which exists in those zones Z and Z' between the ribbon edges 12A and 12B and the sheets 16A and 16B, the dielectric layer is removed, facilitating clean metal-to-metal contact between the members being welded.

As shown in FIG. 6, when making a weld between members, such as core section 12'' and cover sheets 16A'' and 16B'', which are located proximate members already welded, such as adjacent core section 12' and cover sheets 16A' and 16B', a problem arises due to the existence of an electrical shunt path between the electrodes 28 and 30 through previously welded members 12', 16A' and 16B'. Specifically, when previously welded members 12', 16A' and 16B' are located adjacent unwelded members 12'', 16A'' and 16B'', which unwelded members are located between welding electrodes 28 and 30, the previously welded members 12', 16A' and 16B' constitute a low resistance electrical path between electrodes 28 and 30. This low resistance path is parallel to, or shunts, the desired electrical path between electrodes 28 and 30 through the members to be welded, namely, members 12'', 16A'' and 16B'', and when capacitively stored electrical energy is discharged by the circuit 50 through electrodes 28 and 30 in the course of the welding process, shunts welding current designed for passage through the members 12'', 16A'' and 16B'' to be welded, away from these members and through previously welded members 12', 16A' and 16B'. The shunting of welding current from the desired path through members 12'', 16A'' and 16B'' to be welded may prevent, or at least limit the duration of, plasticity of the surface layers of the members to be welded which define the high electrical intensity zones Z and Z'. If the surface layers of sheets 16A'' and 16B'' and ribbon edges 12A'' and 12B'' of core section 12'' in the zones Z and Z' of high electric field intensity do not become plastic, i.e., molten, or if plastic do not remain plastic for an interval sufficient to permit application of the upset force, the weld cannot be completed by the desired forging action in the manner described.

To reduce the electrical energy shunting effect on members 12'', 16A'' and 16B'' to be welded produced by previously welded sections 12', 16A' and 16B', magnetic circuit means M are provided adjacent the electrodes 28 and 30 proximate the juncture of previously welded members 12', 16A' and 16B' and the members to be welded 12'', 16A'' and 16B'' are provided. The magnetic circuit means M provide a high intensity magnetic field in the direction of arrows m. The magnetic field indicated by arrows m interacts with the capacitively stored electrical energy discharged through electrodes 28 and 30 by circuit 50 to limit the amount of such discharged electrical energy which is shunted through previously welded members 12', 16A' and 16B'. Thus, the discharged electrical energy flow between electrodes 28 and 30 is constrained to pass through the members to be welded 12'', 16A'' and 16B'' to produce the desired plasticity of core ribbon edges 12A'' and 12B'' and sheets 16A'' and 16B'' essential to proper welding.

A further embodiment of the invention, in which the electrodes are positioned on the same side of the core, is depicted in FIG. 7. In accordance with this embodiment, a cover sheet 16A is welded to the upper ribbon edges 12A of a honeycomb core 12. The apparatus includes a pair of juxtaposed electrodes 128 and 130 connected via wires 52 and 56 to a source of electrical power (not shown in FIG. 7) such as the capacitive storage electrical energy discharge circuit 50 of FIGS. 3 and 4. Also included is a rotatable back-up roll 131 mounted for rotation about stationary axis 133. The electrode 128 and back-up roll 131 are spaced apart and positioned opposite each other to permit the core 12 and cover sheet 16A to be fed therebetween in the direction of arrow 135 to facilitate, on a continuous basis, the welding of the successive portions of the cover sheet 16A and the core 12. The electrode 130 is positioned on the side of the cover sheet 16A opposite that of the electrode 128 and upstream of the electrode 128 relative to the direction of travel 135 of the moving core 12 and cover sheet 16A.

In operation, the cover sheet 16A and core 12 to be welded are placed between and in contact with the back-up roll 131 and the electrode 128, respectively, with the electrode 130 positioned contacting the core edges 12A at a point upstream of the electrode 128. With the cover sheet 16A and core 12 so positioned, a clamp force $F_c$ is applied to the electrodes 128 and 130, urging them into contact with the outer surface of the cover sheet 16A and the upper ribbon edges 12A of core 12, respectively, to establish low resistance electrical connections between the electrodes 128 and 130 and their respectively associated cover sheet 16A and upper ribbon edges 12A.

An electrical potential is then applied between the electrodes 128 and 130 via wires 52 and 56 to produce a high intensity plasma, or electrical discharge, in the zone Z defined by the upper ribbon edges 12A and oppositely positioned inner surface of the cover sheet 16A located adjacent the electrode 128. The high intensity plasma plasticizes the upper ribbon edges 12A and associated inner surface regions of the cover sheet 16A which define zones Z. While the upper ribbon edges 12A and cover sheet 16A at zones Z are plasticized, an upset pressure $P_u$ is applied between the upper electrode 128 and the back-up roll 131 to unite, by forging action, the plasticized zones of the cover sheet 16A and upper ribbon edges 12A. In accordance with this embodiment, the flow of electrical current, which is necessary to produce plasticity of the upper core ribbon edges 12A and associated regions of the cover sheet 16A, flows between the electrodes 128 and 130 via a path which includes the cover sheet 16A and those upper core ribbon edges 12A of core 12 which lie between and adjacent the electrodes 128 and 130. Thus, electrical current does not flow through the entire core from ribbon edges 12A to ribbon edges 12B.

In accordance with a further modification of the invention herein, and also illustrated in FIG. 7, is the adherence, by welding, electroplating or the like, of an electrically conductive metal coating 140, such as nickel, to the core ribbon adjacent the edges 12A. The total thickness of the conductive metal layer 140 per upper ribbon edge 12A preferably is at least equal to the thickness of the sandwich facing or cover sheet 16A. In a preferred form, the conductive metal layer 140 is produced by welding a wire 141 of circular cross-section to the edge 12A of a ribbon utilizing resistance welding techniques. The ribbons 12 with resistance welded wires at the edges thereof are then formed into a honeycomb core in a conventional manner. The ribbon edges 12A of the core with wires welded thereto are then ground smooth or flat, removing the upper one-half 142 of the wire to expose the upper edge 12A of the core ribbon 12. The conductive metal layer 140 functions to perform a high conductivity current path, at least equal to that of the sandwich cover sheet 16A, further reducing the probability of desintegrating or burning the upper edges 12A of the core when a cover sheet is welded thereto having a thickness greater than that of the core ribbons.

If desired, the edges 12A and 12B of the core ribbon 12 can be modified to enhance the welding process. For example, the edges 12A and 12B of the core ribbon 12 can be serrated, forming a uniform pattern of local projections having high resistance. This enhances the uniformity of weld quality from point-to-point along the honeycomb core panel 10, as well as increases the resistance of the zones Z and Z' relative to the resistance of the core ribbons and cover sheet. Instead of serrating the core ribbon edges 12A and 12B, the inner surface of the cover sheet can be embossed, knurled, or the like to form uniformly distributed localized projections of relatively high resistance.

While the electrodes, such as electrodes 28, 30, 128 and 130, may be fabricated of any suitable electrically conductive material, such as copper and its alloys, the electrodes in a preferred form are fabricated of molybdenum mesh, screen or the like, with the diameter of the wire forming the mesh as well as the spacing between adjacent wires approximately 2 gauge. In accordance with this preferred electrode the molybdenum mesh is mounted on a resilient backing such as a slab, pad or block of polyurethane as, for example, by wrapping the mesh around the urethane block.

In accordance with other modifications or embodiments of this invention, the upset pressure applied to the members being welded while plasticized can be applied ultrasonically in lieu, for example, of the electromagnetic coil 44 depicted in FIG. 4. Additionally, the core 12 need not be of uniform height as shown in FIGS. 1, 3, 4, 6 and 7, but may be non-uniform, such as in the form of a wedge and/or may be formed to a contour of simple or compound nature. Finally, large members may be welded incrementally by successively stepping the members between the electrodes, and/or continuously by advancing the members at uniform speed between electrodes in the form of rolls, etc.

While the invention has been described with respect to the use of capacitively stored electrical energy discharge means for providing the desired short-duration welding current, other sources of short-duration welding current may be utilized. For example, high voltage pulse supplies of the piezoelectric type may be used, as well as high voltage AC sources of high frequency when combined with means to limit the amplification of the high frequency potential to a single cycle.

Also, while the invention is particularly useful in welding honeycomb cores to surface sheets, it can also be utilized to weld other structures in which similar difficulties are present. Further, from the preceding disclosure of the general principles of the present invention, and the above description of a preferred embodiment, those skilled in the art will readily comprehend various modifications to which the invention is susceptible. Accordingly, I desire to be limited only by the scope of the following claims.

Having described my invention, I claim:

1. Apparatus for welding first and second sheet-like members, each having an edge and a planar surface and having thicknesses differing from each other by a factor of approximately 3 or greater, said apparatus comprising:

means for positioning said first and second sheet-like members such that the edge of said first sheet is adjacent the planar surface of said second sheet and slightly spaced therefrom by a gap, said gap having disposed therein a dielectric material susceptive of establishing between said members a localized zone of high electrical field intensity which exhibits a high electrical resistance relative to the electrical resistance of said individual members, means for applying an electrical potential between said members of a magnitude sufficient to electrically break down said dielectric material and produce an electrical discharge at said zone to plasticize said members adjacent said zone, means to apply a force to said members, while said members are plastic at said zone, which is sufficient in magnitude to unite by forging action the plastic weld material of said members adjacent said zone.

2. A method of welding first and second sheet-like members, each having an edge and a planar surface and having thicknesses differing from each other by a factor of approximately 3 or greater, said method comprising the steps of:

positioning said first and second members such that the edge of said first sheet is adjacent the planar surface of said second sheet and slightly spaced therefrom by a gap, disposing a dielectric material in said gap to render said gap susceptive of establishing there across a localized zone of high electrical field intensity which exhibits a high electrical resistance relative to the electrical resistance of said individual members, applying an electrical potential between said members sufficient in magnitude to electrically break down said dielectric material and produce an electrical discharge at said zone and plasticize said members adjacent said zone, and applying a force to said members, while said members are plastic at said zone, which is sufficient in magnitude to unite, by forging action, the plastic material of said members adjacent said zone.

3. Apparatus for welding comprising:

means for positioning first and second members to be welded in an orientation susceptive of producing spaced zones of high electrical field intensity, electrode means contacting different ones of said members for applying an electrical potential between adjacent first sections of said members of a magnitude sufficient to produce a substantial electrical current flow in said zone between said first sections for an interval sufficient to plasticize said members only at said zone between said first sections, means for applying an upset force to said first sections of said members during at least a portion of said interval to unite, by forging action, the plasticized material of said first sections of said members, means for producing relative motion between said electrode means and said first and second members to unite adjacent second sections of said members, said second sections being displaced from said first sections in the direction of said relative movement, said united first sections establishing an alternate current path between said electrodes relative to said second sections, magnetic field generating means located relative to said electrodes and said first and second member sections to generate a magnetic field directed to constrain said weld current to a flow path including substantially only said second sections, thereby avoiding shunting of weld current away from said second sections to said first sections physically adjacent thereto but displaced therefrom.

* * * * *